United States Patent [19]

Gardner, Jr.

[11] Patent Number: 4,942,936
[45] Date of Patent: Jul. 24, 1990

[54] ELECTROHYDRAULIC/AIR BIKE

[76] Inventor: Elmer W. Gardner, Jr., P.O. Box 39463, Cincinnati, Ohio 45239

[21] Appl. No.: 156,910

[22] Filed: Feb. 12, 1988

[51] Int. Cl.$^5$ .......................................... B62M 23/02
[52] U.S. Cl. ..................................... 180/207; 74/127; 280/216
[58] Field of Search ............... 280/201, 212, 214, 215, 280/216, 217, 252; 180/205, 207, 220; 74/127

[56] References Cited

U.S. PATENT DOCUMENTS

| | | | |
|---|---|---|---|
| 450,997 | 4/1891 | Dies | 74/127 |
| 597,621 | 1/1898 | Russell | 74/127 |
| 1,019,637 | 3/1912 | Hays | 280/252 |
| 2,974,646 | 3/1961 | Miller et al. | 91/26 |
| 4,168,758 | 9/1979 | Holt | 280/214 |
| 4,253,551 | 3/1981 | Calabrese | 188/134 |
| 4,445,701 | 5/1984 | Stroud | 280/217 |
| 4,546,990 | 10/1985 | Harringer | 280/216 |
| 4,568,097 | 2/1986 | Faroog | 280/216 |

Primary Examiner—David M. Mitchell

[57] ABSTRACT

A bicycle or motocycle that can be driven either by compressed air or pressurized hydraulics in which either an electric motor operated from a battery source drives a pump or the rider manually provides pedal power for driving the pump in compressing either air or pressurizing hydraulic fluid that is fed through pipelines to a cylinder motor having a piston and rod mechanically connected to a series of clutches that are connected to a series of rectangular or square gears operatively arranged for rotating a series of worm screw gears to the reciprocation of the piston rod whereby the screw gears are connected to an output shaft having a gear operably connected to a second gear that is fixed to the drive axle of the two wheel vehicle for its rotation thereof. Additionally, the arrangement is for the storing of excess pressurized working fluid in a pressure accumulator as auxilliary power for driving the vehicle and for the recovery of kinetic energy during braking and deceleration by the application of regenerative braking to the electric motor and a flywheel is arranged to a pump and operably connected to an alternator for generating electricity from stored potential energy. Pressurized hydraulic fluid or compressed air is fed from storage or a pump for operating the braking system.

1 Claim, 1 Drawing Sheet

ELECTROHYDRAULIC/AIR BIKE

BACKGROUND OF THE PRIOR ART

The basic design and operation of the standard bicycle has changed very little since its inception, still being operational to pedal power applied by the operator rotating a crank to a shaft having a fairly large sproket and chain connected to a smaller sprocket fixed to the rear axle for driving the rear wheel. Improvements to this adaptation have been made over the years with the addition of multiple sprockets of variable diameter fixed to the axle of the rear wheel that can provide a variable speed to the bicycle when the rider manually manipulates a derailer in shifting the chain from one sprocket to the other, depending upon the desired gear ratio.

Although multiple gear ratios are available, including specialized mountain climbing bikes having gear ratios of at least seventeen different speeds (some even greater) for traveling up steep inclines, the disadvantage is a matter of physical endurance and stamina of the rider, because according to published scientific statistics the average person can provide about only one tenth of a horsepower output, and it can be somewhat greater only for a short period of time. Therefore there is a physical limitation as to the speed and hill climbing ability of the bicycle and rider, regardless of how many gears are made available.

The trend with bicycles of today is of lighter structure by the use of very light weight materials as aluminum and other applications such as tires being thinner and the wheels of greater diameter in order to give greater speed and reduce friction and drag with less energy outut. Most bicycles are fairly adequately designed so that a controllable speed on level terrain and downgrade can be provided by the rider without power assistance from another source, as with an auxiliary power device. However, mountainous and hilly terrain and the physical makeup of the rider can present an obstacle for those persons of operating the standard bicycle that is available on the market today, as even experienced riders often have to dismount and push the vehicle to the top of a hill when the incline is too steep.

There is a need for a bicycle having the capability for carrying a payload other than the rider over long distance and terrain that could exceed the rider's endurance and stamina and that still could be operated without need for audiliary power, such as an electric motor or gasoline engine.

A bicycle having a manual auxiliary power system must be compact, lightweight, inexpensive, easy to maintain and completely safe in its application, and it should provide practically anyone, regardless of their physical makeup, endurance and stamina, the capability to maneuver a bicycle in almost any type of terrain without putting an undue physical strain upon the rider.

Prior art discloses several inventions that show considerable improvement in the method for providing auxiliary power to a bicycle, including the application of compressed air, hydraulics and a flywheel for storing energy. However, nowhere in prior art is there disclosed a method for providing a reserve energy source that can be made available to the rider when the requirement for the expenditure of energy exceeds that available and the physical force of the rider has reached its maximum output.

One great difficulty experienced with either compressed air or the application of hydraulics for driving a bicycle when manual pedal power is provided by the rider is the slow rotation of the crank and shaft to the pump, particularly at slow speeds and on an incline where auxiliary power is greatly needed, in that the pump will not provide enough pressure and volume of working fluid to compensate for the greater force that is needed for driving the wheels. The slow pedal movement on startup and on inclines can practically eliminate any benefit gained by having auxiliary power equipment for assisting the rider in moving the vehicle, for the rider still has limited power available for driving the wheels when it is most needed.

BRIEF SUMMARY OF THE INVENTION

An improvement disclosed with this invention over the prior art is an effective means for providing the rider of a bicycle with reserve auxiliary power that can be used during startup and on steep inclines, that is made available from energy stored in a compressed air tank or in a pressure accumulator. Excess working fluid is accumulated and stored during vehicle deceleration and braking and also during periods of acceleration when either the pedal power provided by the operator or an electric motor coupled to a pump in pressurizing working fluid exceeds the energy demand at the drive wheel of the bicycle.

Additional kinetic energy is recovered during the operation of the bicycle by the application of alternators for generating electricity for storage in a battery, a flywheel for storing potential energy and by using the electric motor as a generator for generating electricity during braking and deceleration of the bicycle. This is a predetermined and preset arrangement that is controlled by the rider of the bicycle through select switching controls.

As with the standard bicycle there are two pedals connected to a crank and shaft having a sprocket that is chained connected for driving the rear wheel. However, with this invention a large diameter pulley is connected to the same crank and shaft and not to the rear drive wheel but is belt connected to a pump for either compressing air or pressurizing hydraulic fluid.

Also, the pump can be driven by a small electric motor (D.C.) that is battery operated. A free wheeling flywheel is connected to and driven by the pump shaft for storing potential energy that is used for driving an alternator in generating electricity for storage in the battery.

Compressed air or pressurized hydraulic fluid is fed to an accumulator for storage and released as needed through valves to a cylinder motor having a reciprocatable piston rod operatively connected to a series of clutches having either a rectangular or square gear operably arranged in circumference to a series of screw gears for providing rotation to a geared output shaft operably connected for driving the rear wheel. The arrangement also can be for two wheel drive. The pressurized fluid at the accumulator also serves a hydraulic or air braking system comprising a rotor and disc brake mounted to the front and rear wheel.

The electrical circuitry comprises a 12 volt storage battery connected to a voltage regulator and a multiple switching relay for automatically operating electric solenoid valves at the accumulator and to and from the cylinder motor for controlling pressurized fluid, and also for the hydraulic braking of the vehicle. A master control switch controlled by the rider also controls the electrical switching to a series of clutch mechanisms that control the operation of the standard drive sprocket and a series of pulleys for operating a series of alternators for generating electricity, for operating the flywheel for storing potential energy and for controlling the operation of the pulley and belts connected for operating the pump for either compressing air or pressurizing hydraulic fluid. The lighting system, brakes, tail light, headlights, horn and accessories are also controlled by the same electrical circuitry, and, including a small electric motor that is connected by belt for driving a pump and for regenerative braking in generating electricity for storage. (as explained previously)

Objects of the Invention are:
(1) to provide for a rider operated auxiliary pedal powered bicycle that is highly self sustaining and has the capability and utility of being rider uniformly operable over long distance and hilly terrain
(2) to provide for the accumulation of energy as compressed air or pressurized hydraulics for driving a bicycle
(3) to provide for a combination of rider pedal power and a small electric motor for driving a pump in pressurizing working fluid
(4) to provide for the recovery of kinetic energy during braking and deceleration of a bicycle by the application of alternators and regeneration braking to the operative elements of the bicycle for generating electricity
(5) to provide for the application of a flywheel for storing potential energy and in driving an alternator for generating electricity
(6) to provide for the application of a cylinder screw motor operative to pressurized working fluid and that can provide a high speed positive drive to an output shaft with no wasted motion
(7) to provide for an inexpensive, reliable, durable and safe auxiliary power drive system
(8) to provide for a hydraulic or air braking system for a bicycle.

DETAILED DESCRIPTION OF THE INVENTION

Figure 1:
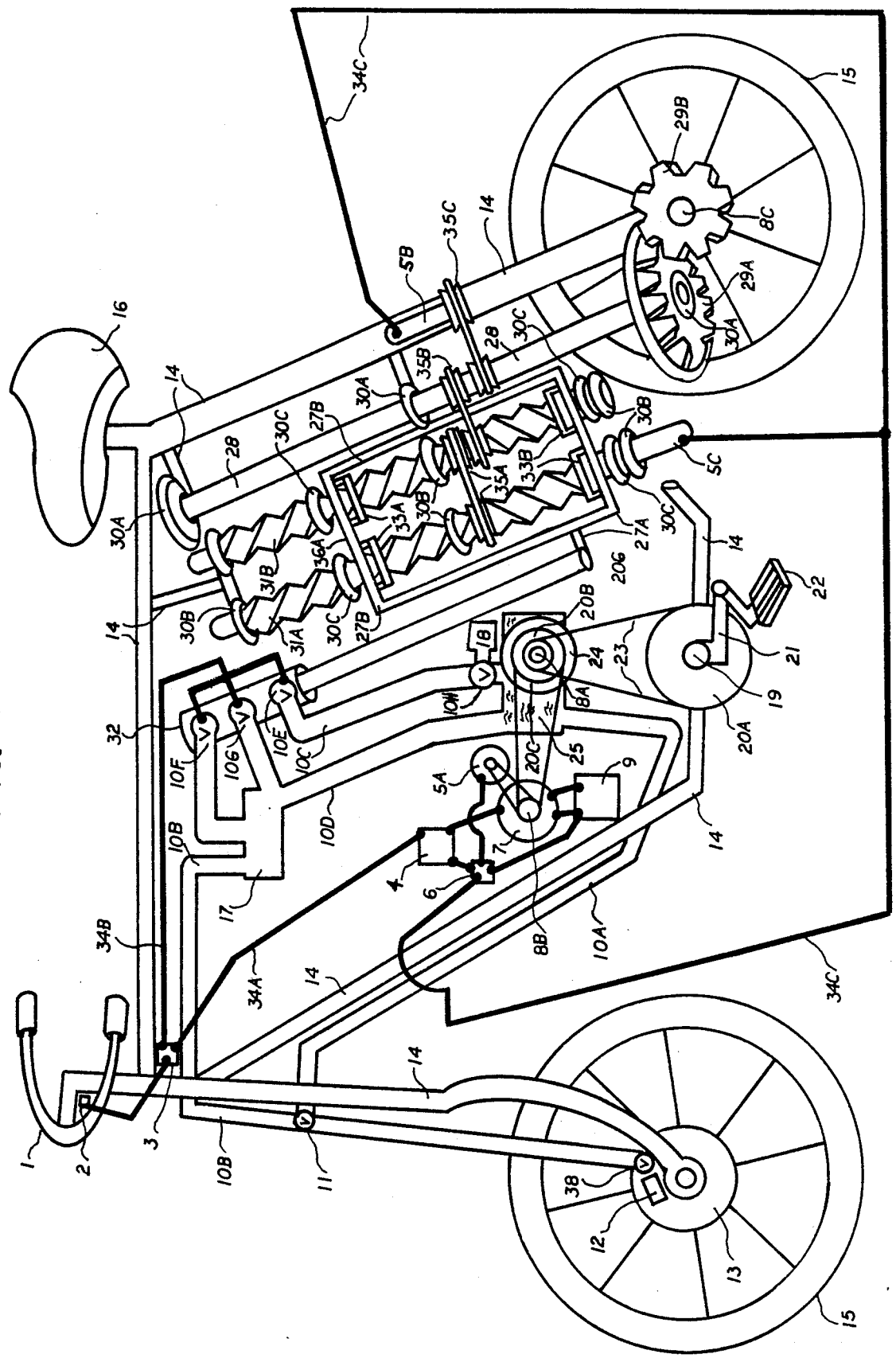
FIG. 1 is a drawing showing a two wheeled vehicle having the rear wheel and axle connected to bevel gears operative to an output shaft operably connected to rotatable worm screw gears driven by rectangular or square gears and a reciprocatable piston and rod to a cylinder operated either by compressed air or hydraulics pressurized by a pump driven either by a crank and pedal or an electric motor connected to a battery source.

Shown in the drawing for FIG. 1 is a standard bicycle frame 14 supportive to two wheels 15 with a seat 16 for the rider and handle bars 1 for steering. Not shown in the drawing is the standard drive sprocket connected to shaft 19 with crank arm 21 and pedals 22 (only one pedal is shown) for driving the rear wheel (the rear drive sprocket and chain are not shown in the drawing).

With this invention the application is for the adaptation of a large diameter pulley 20A fixed to the same shaft 19 and operated by pedals 22 and crank arm 21 that is not operably connected to the rear drive wheel 15 but is connected by a belt 23 to either a hydaulic or air pump 25 for compressing air or pressurizing hydraulic fluid. The pump 25 has a shaft 8A with a pulley 20B and a free wheeling flywheel 24 connected to the same shaft that is operative to a clutch mechanism 20C and pulley with a belt connected to the electric motor 7 (fully explained later). The preferred embodiment is for the use of pulleys and belts that allow for a quieter operation and easier adaptation for clutch action, although chains operable to sprockets also can be used.

The rider can drive the pump 25 simultaneous to driving the rear wheel 15, or it can be a separate operation, because at the shaft 19 there is a free riding clutch disconnect that allows the pulley 20A to be driven in unison with the drive sprocket (not shown) with the crank 21 and pedals 22 remaining stationary. The pulley 20A is engaged by the rider as the pedals 22 are driven in a forward movement, and a reverse or stationary movement to the pedals 22 disengages, by clutch action, the crank 21 and pedals 22 from the shaft 19 allowing the pulley 20A to be driven by the rear drive sprocket (not shown) at the rear wheel 15 and the drive sprocket (not shown) at the shaft 19, so that the rear wheel 15 can drive the pump 25, the flywheel 24 and the electric motor 7 during braking and deceleration of the vehicle. And the drive sprocket (not shown) that is operably connected to the rear wheel 15 is engaged or disengaged by a clutch mechanism (not shown) that can be electrically controlled by the rider (explained later).

A small battery 9 powered 12 volt D. C. electric motor 7 is belt connected to shaft 8A and clutch pulley 20B for driving the pump 25 and also the flywheel 24 for storing potential energy. The clutch mechanism 20C and pulley that engage and disengage the flywheel 24 to and from the pump 25 shaft 8A is belt connected to a clutch and pulley 8B at the electric motor 7 shaft that also is belt connected to an alternator 5A that is operative to the flywheel 24 for generating electricity for storage in battery 9 when either the electric motor 7 drives the pump 25 or the pulley 20A drives the pump 25 as the pedals 22 are operated by the rider. The arrangement is for the flywheel 24 and alternator 5A to be inoperable with disengagement of clutch 20C by the rider when the vehicle is driven up a steep incline and during startup (clutches explained later). The rider can also drive the pump 25, flywheel 24 and alternator 5A without driving the rear wheel 15 by disengaging the clutch (not shown) at the drive sprocket (not shown) and rear wheel 15, and this also would be applicable when the electric motor 7 is driving the pump 25 for pressurizing fluid (explained later).

The pressurized working fluid that is generated at the pump 25 is fed through pipeline 10C to a pressure accumulator 18 for storage or for immediate application through pressure relief valve 10H (fully explained later), for transmitting working fluid through pipeline 10C and valve 10E in loading cylinder 32. The preferred embodiment is for cylinder 32 to have a small bore that would not require a large quantity of working fluid for its operation. Also the preferred embodiment is for pressurized hydraulic fluid to be fed to the pressure accumulator 18 for storage so that it can be fed through brake line 10C and presssure valve 11 for input of fluid to caliper 12 and pad for making braking connection to rotor 13 at wheels 15 (brake elements are not shown for the rear wheel). Used fluid is expelled through valve 38 at the caliper 12 for return to storage reservoir 17 through pipeline 10B and for recycling to the pump 25 through return pipeline 10D. Pressurized working fluid always can be made available at the pressure accumulator 18 either by the rider providing pedal power to driving the pump 25 or by the application of the electric motor 7.

As shown in the driving of FIG. 1, cylinder 32 is vertically positioned and supported at the vehicle frame 14 with a reciprocatable piston rod 26 connected to and for reciprocatably driving rod elements 27A and 27B. Each rod is connected at clutch plates 36A and 36B that are in working relationship to a clutch bearing 30C and also to a second clutch plate 33A and 33B that have fixed to its center a rectangular or square gear (not shown) opening fixed at one end of two hollow shafts (not shown). The clutch plates and bearings named above also are adapted to and in circumference to the two separate hollow shafts (not shown) that are arranged to slide freely in circumference to and at each end of rotatable worm screw gears 31A and 31B.

A reciprocatable movement of rods 27A and 27B causes one clutch plate, either 36A or 36B, to be driven against one of the second clutch plates, either 33A or 33B, causing it to rotate one of the square or rectangular gears (not shown) that are in working relationship and in circumference to the screw gear 31A or 31B, also causing the gear to rotate. The other clutch plate, either 36A or 36B, is reciprocatably driven against either of clutch bearings 30C causing either clutch plate 33A or 33B and the rectangular or square gear (not shown) also to rotate freely the screw gear, either 31A or 31B, or vice versa. In this manner the conditions reciprocation of piston rod 26 provides continuous rotation to screw gears 31A and 31B.

In FIG. 1 there is disclosed a first and a second screw gear each having a supportive bearing 30B in circumference to each shaft end 31A and 31B and also to its center that are mounted to the vehicle frame 14. Operably connected to the center of each screw gear is a pulley and belt 35A with a third pulley 35B connected at the center of the second screw gear for providing transfer of the rotation of the screw gears 31A and 31B to a parallel positioned final output shaft 28 that is vertically mounted to bearings 30A that are supportive to the vehicle frame 14. Mounted to the lower end of output shaft 28 is a bevel gear 29A that is operably connected to a second bevel gear 29B that is fixed to one side of the drive axle 8C of the bicycle that is driven by the rotational force of the pair of screw gears and the output shaft 28 in driving the rear wheel 15.

Provision is made for the recovery of kinetic energy by using the flywheel 24, a series of alternators, 5A, 5B and 5C and the electric motor 7 for generating electricity during braking and free wheeling of the bike, such as when going down a grade or hill, by the reverse application of output shaft 28 in driving alternator 5B that is operable to pulley and belt 35C and at the worm screw gears 31B in driving alternator 5C through a clutch mechanism (not shown), for the flywheel 24 to be driven by pulley 20A operable to the sprockets at the drive wheel (not shown) and in driving the electric motor 7 in regenerative braking with the flywheel 24 driving the alternator 5A for generating electricity for storage in battery 9.

Clutch mechanisms 36A and 36B are automatically disengaged from the screw gears 31A and 31B when the line pressure is released at the cylinder 32 through pressure relief valve 10H causing the fluid to be transmitted through valve 10G to be transmitted to storage reservoir 17 as the rider either presses the brake switch 2 that is the control switch at the handle bars 1 and through a master control switch 2 for opening the pressure relief valve 10H, or manually operates the switch 3 for opening the relief valve 10H. The master control switch 3 is wired to a multiple switching relay 4, that receives its electrical energy from voltage regulator 6 that is wired to storage battery 9 and that regulates the input and output of voltage at the electrical circuits, including the electric motor 7. The preferred embodiment is for the alternators 5A, 5B and 5C to be operative automatically by select wiring at relay 4 to the pressure relief switch 10G at the cylinder motor 32 and to the brake switch 2 at the handle bars 1, so that when the brake switch 2 is depressed on braking of the bicycle of the rider, an electrical impulse will be sent to valve 10G for releasing the pressurized fluid at the cylinder motor 32 that automatically releases the pressure at the piston rod 26 and to the levers 27A and 27B at the clutch plates 36A and 36B so that the pressure will be released at the clutches and the worm screw gears 31A and 31B can rotate freely as driven in reverse by the application of pulleys and belts 35A and 35B at the output shaft 28 (as previously explained).

And the preferred embodiment is for the valve 10H that is the pressure relief valve, the cylinder 32 input valve 10E and cylinder output valves 10F and 10G to be electric solenoid valves that would be operated automatically through relay 4 and the master control switch 3 at electrical wire 34B. However, the valves could be operated manually as could also the clutch mechanisms. It is preferred that the clutches 8B at the electric motor 7, 20C at the flywheel 24 to alternator 5A, clutch 20B at the pump 25 shaft, the clutches at alternators 5B and 5C and the clutches at the drive sprockets at the rear wheel 15 (not shown) all be operated electrically through relay 4 and the master control switch 3 (clutches are not shown), however, the clutches could be operated manually by the rider pushing and pulling a system of levers (not shown). Connected to levers 27A and 27B at the piston rod 26 are two proximity switches (not shown) wired to relay 4 (wiring not shown) providing automatic control for the opening and closing of solenoid valves 10E and 10F for the input and output of fluid at cylinder motor 32. Operation of the brake switch 2, that is wired 34A, 34B to electric solenoid valve 10G and relay 4, causes this valve to open for the output of pressurized fluid to the braking system (as previously explained). An ammeter (not shown) is wired 34A to the battery 9 and charging system, alternators 5A, 5B and 5C, and that is positioned to the handle bars 1 as a visual indicator to the rider the electrical current available and—the need for the rider to provide pedal power to the flywheel 24, the alternator 5A in order to generate electricity when the charge level reaches a predetermined condition that would be inadequate for operating the electrical system that also includes the lighting system, directional signals, tail lights, brake lights etc. that are controlled at the master control switch 3.

The entire operative elements can be enclosed inside a housing (not shown) that would provide for a protective shield to the rider and the equipment. The cylinder screw motor arrangement is vibrationless and there is little stress to the frame and operative elements of the vehicle.

An alternative method for driving the pump 25 is for its connection directly to the crank 21 and shaft 19 with the storage reservoir 17 positioned above it, and the screw gears 31A and 31B and cylinder 32 with rod 26 to be positioned horizontally to the bicycle frame 14, although the perpendicular arrangement as shown in the drawing is the preferred embodiment because the movement of the piston and rod 26 do not operate to opposing forces to vehicular movement.

Though either compressed air or pressurized hydraulics can be used for operating the cylinder motor 32, the preferred embodiment is the application of hydraulics because it is a closed circuit system and hydraulics will not go "soft" under a load. However, using compressed air does have several advantages in that an air tank can be refilled with compressed air from an external source, such as at a service station, and the stored compressed air could provide greater compression than when the pump 25 is driven either by the rider or the electric motor 7. The convenience and availability of compressed air and the fact that the cylinder bore is small requiring a very small amount of working fluid is a viable option for the rider who could use the stored energy during steel hill climbs etc.

The alternative of providing the rider with the means to use auxiliary power as frequently as possible with the capability of regenerating electricity during braking and deceleration, including generating electricity even while the bicycle is being accelerated, is a method of conserving energy and making this energy available for operating the electric motor 7 whenever it is most needed, and without stopping the bicycle for the recharging of the battery. By the addition of a larger size electric motor, the same application can be applied for driving motorcycles.

The invention claimed is:

1. A two wheeled motor and occupant propelled vehicle having a fluid power system driven by the occupant and an electric motor and also including means for recovery of kinetic energy comprising:

a pump for pressurizing a working fluid in an accumulator and to provide power to drive the vehicle;

a pedal crank and pulley journalled to the vehicle frame for operating said pump;

a D.C. electric motor and battery operatively connected for additionally driving said pump and providing regenerative braking;

a flywheel capable of storing potential energy operatively connected to said pump;

an alternator connected to said flywheel for charging said battery;

a cylinder motor connected by solenoid valves and conduits to said pump for receiving pressurized working fluid controlled by said solenoid valves;

a piston rod in said cylinder motor providing a reciprocating linear power output;

a pair of worm screw gears each including a worm screw journalled for rotation to the said vehicle frame and rectangular or square gear elements arranged in circumference around and engaging said worm screw for reciprocation therealong thus imparting rotation to said worm screw;

clutch means for selective engagement of said rectangular or square gears to said worm screws connected to said piston rod for linear reciprocation therewith;

An output shaft connected for rotation by said worm screw gears and to a wheel to drive the vehicle;

electric circuit means deriving power from said battery for selective control of said D.C. electric motor; for selective control of said solenoid valves, and for selective control of said clutch means during acceleration, deceleration and braking; and brake means on a wheel of said vehicle for receiving working fluid from said accumulator.

* * * * *